United States Patent [19]

Wordin

[11] Patent Number: 5,601,276
[45] Date of Patent: Feb. 11, 1997

[54] RETROFIT VALVE STEM SEAL ASSEMBLY

[76] Inventor: John J. Wordin, 735 N. 900 East, Shelley, Id. 83274-5209

[21] Appl. No.: 600,403

[22] Filed: Feb. 12, 1996

[51] Int. Cl.$^6$ ................................................ F16K 41/06
[52] U.S. Cl. ................................ 251/214; 251/304
[58] Field of Search ........................... 251/214, 309, 251/304

[56] References Cited

U.S. PATENT DOCUMENTS 4,328,974 11/1982 White et al. ................... 251/214 X
4,878,652 11/1989 Wordin ........................... 251/181
5,044,606 9/1991 Wordin ........................... 251/214

OTHER PUBLICATIONS

H. W. Reddik and F. H. Miller "Advanced Mathematics For Engineeers" John Wiley and Sons 1955 pp. 102–103.
"Marks Standard Handbook for Engineers" T. Brumeister, Editor 8th Edition McGraw–Hill Book Co. 1979 pp. 2–41.

Primary Examiner—John C. Fox

[57] ABSTRACT

A retrofit valve stem seal assembly, which can be retrofitted to existing quarter-turn valves already in service, is provided. The retrofit valve stem seal assembly is added to the valve stem by inserting a valve stem adaptor onto the valve stem and firmly attaching the adaptor to the valve stem. The inner surface of the valve stem adaptor fits on the valve stem. To prevent leaks between the valve stem adaptor and the valve stem, "O" rings are installed in the valve stem adaptor to bear against the valve stem. A rotatable valve stem adaptor includes a sliding tractrix surface for sliding contact with a stem packing. The stem packing includes a complementary tractrix surface for contacting the sliding tractrix surface on the valve stem. Wear between the contacting surfaces is uniform at all points of contact between the sliding tractrix surface and the complementary tractrix surface, creating and maintaining a dynamic seal. The stem packing also includes an outer cylindrical surface for contacting a complementary cylindrical surface of the valve bonnet creating and maintaining a static seal.

3 Claims, 2 Drawing Sheets

RETROFIT VALVE STEM SEAL ASSEMBLY

BACKGROUND OF THE INVENTION

The present invention relates no packing assemblies that prevent leaks around valve stems.

A problem often encountered with quarter-turn valves, which have been in service for some time, is a leak around the valve stem due to wear on the stem packing caused by repetitive opening and closing of the valve. The conventional shape of a stem packing is a cylinder with a hole through the center to receive the valve stem. A gap develops between the stem packing and the valve stem due to uneven frictional wear. This gap allows leaks to occur. It would be desirable, therefore, to equip existing quarter-turn valves with a stem seal assembly such that it does not develop leaks between the stem packing and the valve stem or any other possible leak paths.

A new and novel approach to achieve this goal was shown in U.S. Pat. No. 5,044,606, Wordin, 1991. A tractrix shape on the valve stem was introduced for the stem packing to bear against. The tractrix shape is selected because it provides even and uniform wear on the stem packing as the valve stem rotates against the stem packing. Tests have shown no leaks develop between the stem packing and valve stem after hundreds of thousands of open-close cycles for such a valve. However, the referenced patent is for new valve manufacture and does not lend itself to retrofitting a valve stem packing to existing valves already in service.

Numerous benefits would result from the use of such a stem seal assembly when installed in existing valves. Chemical Plant personal would enjoy increased safety resulting from the positive containment of hazardous or toxic substances. Environmental quality would be enhanced around petro-chemical plants and refineries by the positive containment of volatile substances. Companies could easily comply with Environmental Protection Agency regulations. Stem seal leaks as a source of objectional odors would be eliminated. Power plants would become more efficient by the positive containment of steam. Maintenance costs caused by the need to frequently tighten stem seal packings will be substantially reduced.

Accordingly, it is an object of the present invention to equip existing quarter-turn valves with a stem seal assembly which does not develop leaks between the stem packing and the valve stem.

Additional objects, advantages, and novel features of the invention will be set forth in the description that follows and will become apparent to those skilled in the art or may be learned with the practice of the invention. The objects and advantages of the invention may be realized by means of the instrumentalities and combinations further pointed out in the appended claims.

SUMMARY OF THE INVENTION

To achieve the foregoing and other objects, as described below, a retrofit valve stem seal assembly, which can be retrofitted to existing valves already in service, is provided. Picture a valve bonnet of an existing valve which has a valve stem passing through it. The retrofit valve stem seal assembly is added to the valve stem by inserting a valve stem adaptor onto the valve stem. A see screw is installed in the valve stem adaptor. Once the set screw is tightened, this enables the valve stem adaptor to rotate in unison with the valve stem. Alternate means, such as a pin installed through the valve stem and the valve stem adaptor, welding, or bonding could also be employed to make an attachment. The inner surface of the valve stem adaptor fits on the valve stem. To prevent leaks between the valve stem adaptor and the valve stem, "O" rings are installed in the valve stem adaptor to bear against the valve stem. The outside shape of the stem seal adaptor is a tractrix curve. A tractrix is a curve the length of whose tangent, from point of tangency of the curve to the x-axis, is constant. This shame is rotated about the axis of the valve stem to form a body of revolution called a pseudosphere. A rotatable valve stem adaptor includes a sliding tractrix surface for sliding contact with a stem packing. The stem packing includes a complementary tractrix surface for contacting the sliding tractrix surface on the valve stem. Wear between the contacting surfaces is uniform at all points of contact between the sliding tractrix surface and the complementary tractrix surface, creating and maintaining a dynamic seal. The term dynamic seal is defined to mean the interface of contacting tractrix surfaces where these surfaces are able to slidingly rotate past one another while effectively preventing fluid communication through said interface. The stem packing also includes a cylindrical surface for contacting a complementary cylindrical surface of the valve bonnet creating and maintaining a static seal. The term static seal is defined to mean the interface of stationary contacting cylindrical surfaces which effectively prevent fluid communication through said interface.

Means are provided for urging the stem packing against the valve stem adaptor and against the valve bonnet to create a dynamic seal between valve stem adaptor and stem packing and to create a static seal between the complementary cylindrical surface of the valve bonnet and the cylindrical surface of the stem packing.

More specifically, the urging means may include a flange held in place by a plurality of screws, nuts, and washers. A spring is compressed by the action of the flange being held in place by the plurality of screws, nuts, and washers. The spring is compressed against a top surface of a gland flange, which transmits the force from the spring to the bottom surface of the gland flange. The bottom surface of the gland flange transmits the force from the spring to the top surface of the stem packing, whereby the sliding tractrix surface of the stem packing is urged by force from the spring against the complementary tractrix surface of the valve stem adaptor, thereby creating a dynamic seal. Also, preferably, the bottom surface of the gland flange and the top surface of the stem packing are slanted, whereby the stem packing is urged against the valve stem under the force from the spring. The bottom surface of the gland flange transmits the force from the spring to the top surface of the stem packing, by which the stem packing is urged by the force from the spring against the complementary cylindrical surface of the valve bonnet, creating a static seal.

in accordance with yet another aspect of the invention, a valve stem adaptor is provided which includes a sliding tractrix surface for sliding contact with a complementary tractrix surface of a stem packing.

In accordance with yet another aspect of the invention, a valve stem packing is provided which includes a sliding tractrix surface for sliding contact with a complementary tractrix surface of a valve stem adaptor.

In operation of the retrofit valve stem seal assembly of the invention, the stem packing remains stationary while the valve stem with its associated valve stem adaptor rotates. To ensure that the stem packing remains stationary, the surface finish on the valve stem adaptor is smooth, and the surface finish on the valve bonnet is not as smooth. The stem packing thus adheres to the valve bonnet and allows the smooth valve stem adaptor to rotate next to the stem packing.

The preferred materials for the stem packing are those manufactured by United Products and Services, 810 William Pitt Way, Pittsburgh, Pa. 15238. These materials are compliant and impregnated with grease. Typical materials for stem packing can also be used, such as Teflon and Grafoil. Grafoil is a registered trademark of Union Carbide Corporation, U.S. Pat. No. 3,404,061.

Other objects of the present invention will become apparent to those skilled in this art from the following description, which shows one preferred embodiment. By way of illustration, the invention will be set forth in the description that follows and will become apparent to those skilled in the art upon examination of the following or may be learned with the practice of the invention. The drawings and descriptions shall be regarded as illustrative in nature and not as restrictive to the invention in any way.

BRIEF DESCRIPTION OF THE DRAWINGS

The accompanying drawings incorporated in and forming a part of the specification, illustrate several aspects of the present invention, and together with the description serve to explain the principles of the invention.

DETAILED DESCRIPTION OF THE INVENTION

Figure 1:
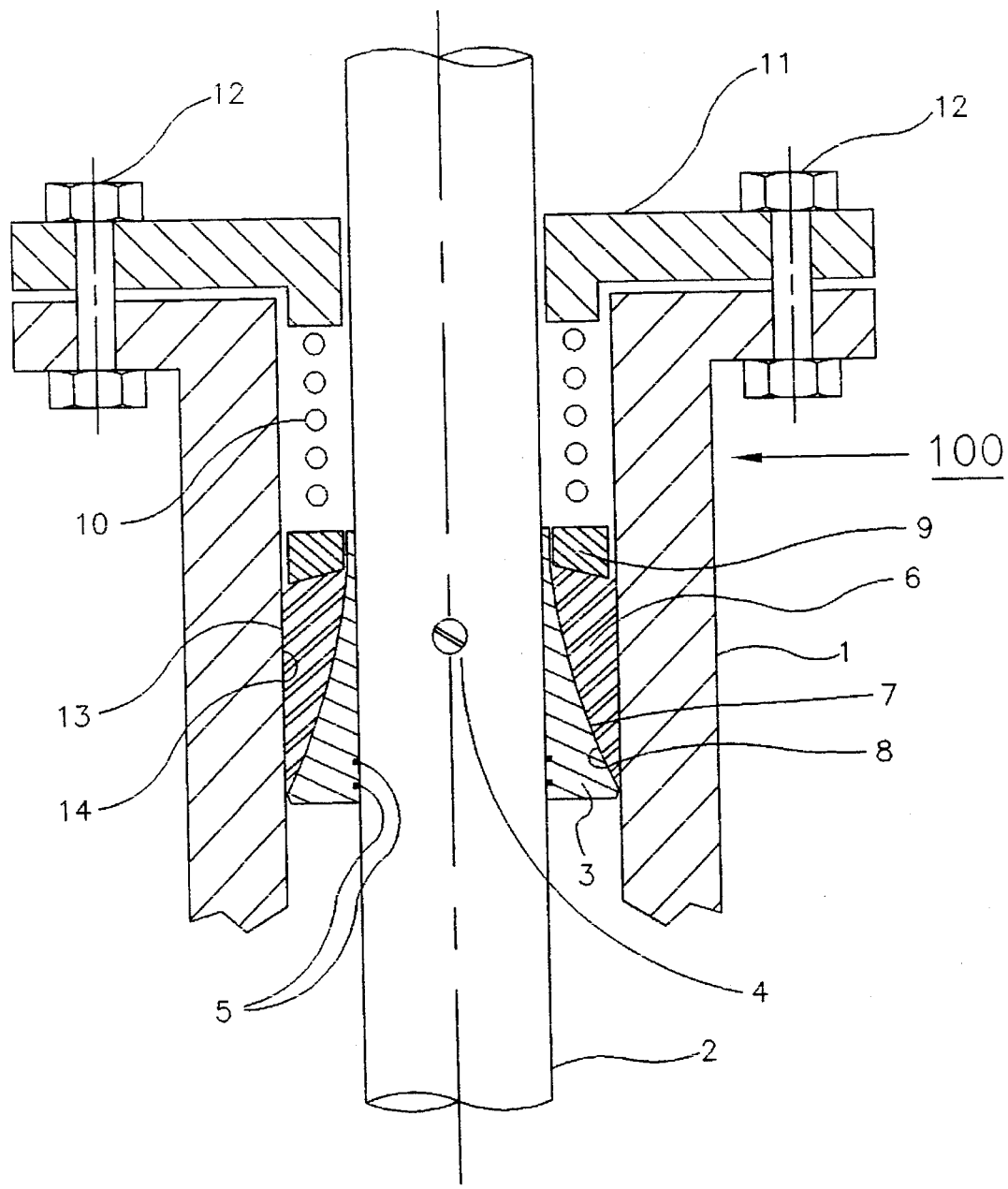
FIG. 1 is a cross-sectional view of a retrofit valve stem seal assembly used to prevent leaks along a valve stem for a quarter-turn valve, such as a ball valve or a plug valve.

FIG. 1 presents a drawing of the preferred embodiment of this invention. Pictured is a retrofit valve stem seal assembly 100 attached to a valve bonnet 1 of an existing valve which has a valve stem 2 passing through it. The retrofit valve stem seal assembly 100 is added to the valve stem 2 by inserting a valve stem adaptor 3 onto the valve stem 2. A set screw 4 is installed in the valve stem adaptor 3. Once the set screw 4 is tightened, this action enables the valve stem adaptor 3 to rotate in unison with the valve stem 2. Alternate means to make an attachment, such as a pin installed through the valve stem 2 and the valve stem adaptor 3, welding, or bonding could also be employed. The inner surface of the valve stem adaptor 3 fits on the valve stem 2. To prevent leaks between the valve stem adaptor 3 and the valve stem 2, "O" rings 5 are installed in the valve stem adaptor 3 to bear against the valve stem 2. The outside shape of the stem seal adaptor 3 is a tractrix curve. This shape is rotated about the axis of the valve stem 2 to form a body of revolution. This comprises a sliding tractrix surface 7 on the valve stem adaptor 3. Stem packing 6 includes a complementary tractrix surface 8 for contacting the sliding tractrix surface 7 on the valve stem adaptor 3. Wear between the contacting surfaces is uniform at all points of contact between the sliding tractrix surface 7 and the complementary tractrix surface 8, creating and maintaining a dynamic seal. Stem packing 6 also includes cylindrical surface 13 for contacting complementary cylindrical surface 14 of valve bonnet 1.

Means are provided for urging stem packing 6 against a valve stem adaptor 3 and against valve bonnet 1, to create a dynamic seal between valve stem adaptor 3 and stem packing 6 and to create a static seal between the complementary cylindrical surface 14 and the cylindrical surface 13 of the stem packing 6.

More specifically, the urging means includes flange 11 held in place by a plurality of screws, nuts, and washers 12. A spring 10 is compressed by the action of the flange 11 being held in place by the plurality of screws, nuts and washers 12. The spring 10 is compressed against a top surface of a gland flange 9, which transmits the force from the spring 10 to the bottom surface of the gland flange 9, the bottom surface of the gland flange 9 transmits the force from the spring 10 to the top surface of the stem packing 6 whereby the sliding tractrix surface 7 of the stem packing 6 is urged by force from the spring 10 against the complementary tractrix surface 8 of the valve stem adaptor 3, thereby creating a dynamic seal. The bottom surface of the gland flange 9 transmits the force from the spring 10 to the top surface of the stem packing 6 by which the stem packing 6 is urged by force from the spring 10 against the complementary cylindrical surface 14 of the valve bonnet 1, creating a static seal.

In accordance with yet another aspect of the invention, a valve stem adaptor 3 is provided which includes a sliding tractrix surface 7 for sliding contract with a complementary tractrix surface 8 of a stem packing 6.

In accordance with yet another aspect of the invention, a valve stem packing 6 is provided which includes a sliding tractrix surface 7 for sliding contact with a complementary tractrix surface 8 of a valve stem adaptor 3.

In operation of a retrofit valve stem seal assembly 100 of the invention, the stem packing 6 remains stationary while the valve stem 2 with its associated valve stem adaptor 3 rotates for the purpose of opening and closing the valve. To ensure that the stem packing 6 remains stationary, the surface finish on the valve stem adaptor 3 is smooth, and the surface finish on the complementary cylindrical surface 14 of the valve bonnet 1 is not as smooth. This causes stem packing 6 to adhere to valve bonnet 1 and allows valve stem adaptor 3 to rotate next to the stem packing 6.

Figure 2:
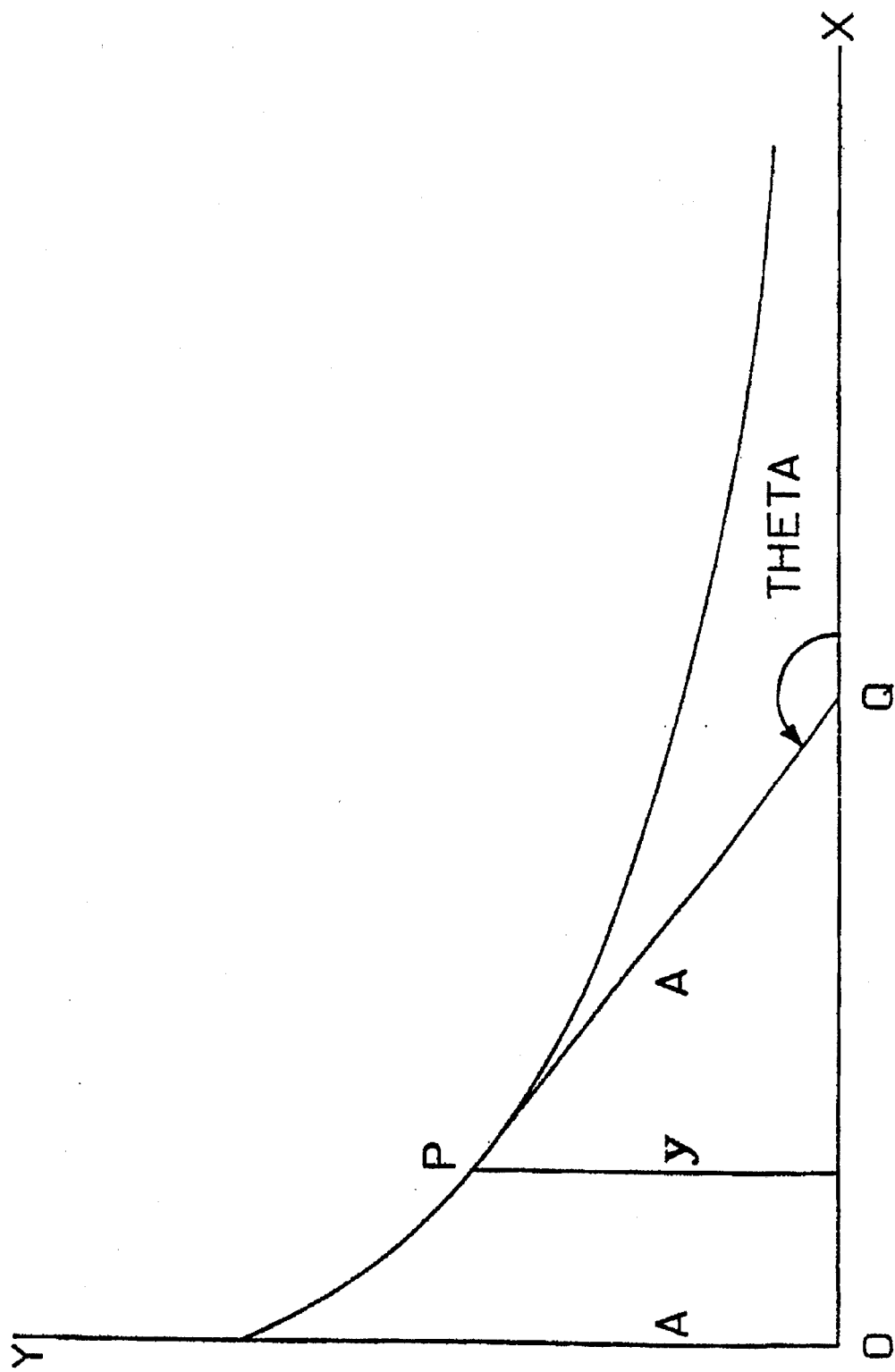
FIG. 2 is a graph of a tractrix curve which forms the basis for the tractrix surfaces of the valve stem adaptor and the stem packing.

With reference to FIG. 2, a tractrix is a curve the length of whose tangent, from point of tangency of the curve to the x-axis, is constant. In FIG. 2, heavy martial P is dragged along a rough horizontal plane by string PQ of constant length A. The path of P, if Q moves along the x-axis starting at the origin when P is on the y-axis starting at a distance A from the origin, is a tractrix.

More specifically, by denoting THETA as the obtuse angle of the tangent line PQ to the positive x-axis, by a derivation set forth on pages 102–103 in the book by H. W. Reddick and F. H. Miller, *Advanced Mathematics for Engineers*, the equation for the tractrix is:

$$X = A * \cosh^{-2}(A/Y) - \sqrt{(A^2 - Y^2)}$$

The tractrix surfaces employed in the invention are obtained by rotating a tractrix curve though three-dimensional space about the x-axis. (See further U.S. Pat. No. 4,878,652, issued Nov. 7, 1989, to Wordin and U.S. Pat. No. 5,044,606, issued Sep. 3, 1991, also to Wordin.) The above equation may also be found in Marks Engineering Handbook, 8th edition, p. 2–41.

In summary, numerous benefits have been described which result from employing the principles of the invention. With the invention, a valve is provided which does not develop leaks between a valve stem adaptor and its stem packing for an existing valve.

The foregoing description of the invention has been presented for purposes of illustration and description. It is not intended to be exhaustive or to limit the invention to the precise form disclosed. Obvious modifications or variations are possible in light of the above teachings. For example, the retrofit valve stem packing assembly invention can be used with virtually any type valve that is operated through a quarter turn for opening and closing, such as a ball valve, plug valve, or a butterfly valve. Furthermore, the retrofit valve stem seal assembly of the invention can be used with hand-operated valves or with valves that are power-operated by an actuator.

The embodiment was chosen and described in order to best illustrate the principles of the invention and its practical application to thereby enable one of ordinary skill in the art to heat utilize the invention in various embodiments and with various modifications as are suited to the particular use contemplated. It is intended that the scope of the invention be defined by the claims which are appended.

The embodiments of this invention in which an exclusive property or privilege is claimed are defined as follows:

1. A retrofit valve stem seal assembly including means for providing uniform wear at all points of contact between contacting parts, said assembly comprising:

a rotatable valve stem adaptor firmly attached to a rotatable valve stem including a sliding tractrix surface for sliding contact with a stem packing, a stem packing including a complementary tractrix surface for contacting said sliding tractrix surface, and including a surface for contacting a bonnet wall, a bonnet including a wall portion for contacting said stem packing surface, and means for urging said stem packing against said valve stem adaptor and said bonnet, whereby a seal is created and maintained between said stem packing and said valve stem adaptor and a seal is created and maintained between said stem packing and said bonnet, wherein said sliding tractrix surface contacting said complementary tractrix surface of said stem seal adaptor are such that wear between said sliding tractrix surface and complementary tractrix surface is uniform at all points of contact between said sliding tractrix surface and said complementary tractrix surface, and such that said urging means is effective in creating and maintaining said seal between said valve stem adaptor and said stem packing.

2. The assembly described in claim 1 wherein said urging means is comprised of:

a flange held in place by a plurality of screws, nuts, and washers a spring compressed by said flange said spring being compressed against a top surface of a gland flange a gland flange receiving urging by said spring on a top surface of a gland flange and a bottom surface of said gland flange urging a top surface of a stem packing whereby the tractrix surface of said stem packing is urged against said valve stem adaptor.

3. A valve stem adaptor which includes a sliding tractrix surface for sliding contact with a complementary tractrix surface of a stem packing such that when used in a retrofit valve stem seal assembly vertical displacement due to wear between said sliding tractrix surface of said valve stem adaptor and said complementary tractrix surface of said stem packing is uniform at all points of contact between said sliding tractrix surface and said complementary tractrix surface and means for urging said stem packing against said valve stem to compensate for said vertical displacement due to wear whereby a seal is created and maintained against said stem packing.

* * * * *